US012516542B1

(12) United States Patent
Goedecke

(10) Patent No.: US 12,516,542 B1
(45) Date of Patent: Jan. 6, 2026

(54) FENCE GATE ASSEMBLY, AND HAT CHANNEL HINGE APPARATUS THEREFOR

(71) Applicant: Bullet Fence Systems, LLC, Okmulgee, OK (US)

(72) Inventor: Ronald D. Goedecke, Okmulgee, OK (US)

(73) Assignee: BULLET FENCE SYSTEMS, LLC, Okmulgee, OK (US)

( * ) Notice: Subject to any disclaimer, the term of this patent is extended or adjusted under 35 U.S.C. 154(b) by 0 days.

(21) Appl. No.: 19/209,168

(22) Filed: May 15, 2025

(51) Int. Cl.
*E04H 17/14* (2006.01)
*E05D 5/02* (2006.01)

(52) U.S. Cl.
CPC ........... *E04H 17/1473* (2021.01); *E05D 5/02* (2013.01)

(58) Field of Classification Search
CPC .............. E04H 17/013; E04H 17/1447; E04H 17/1448; E04H 17/185; E06B 11/02; E06B 11/022; E06B 11/04; Y10T 403/32114; Y10T 403/32131; Y10T 403/32155; E05D 7/0423; E05D 7/043; E05D 2007/0438; E05D 2007/0446; E05Y 2900/40; E05Y 2900/402
USPC ............ 256/26, 73; 403/66, 68, 71; 16/86.1, 16/240, 387, 388, 389
See application file for complete search history.

(56) References Cited

U.S. PATENT DOCUMENTS 1,310,380 A 7/1919 Whittinham
1,631,820 A 6/1927 Jackson
2,150,291 A 3/1939 Paque
2,764,438 A 9/1956 Haviland
3,092,407 A 6/1963 Blonder
3,285,576 A 11/1966 Clark
3,442,110 A 5/1969 Hogan et al.
4,079,481 A * 3/1978 Cacicedo .................. E05D 7/04 16/253
4,124,954 A * 11/1978 Redick .................... E06B 11/04 49/381
5,297,890 A 3/1994 Commins
5,961,242 A 10/1999 Leone
6,386,519 B1 5/2002 Priefert
6,530,561 B2 3/2003 Larsen et al.
7,571,897 B2 8/2009 Heinz
8,286,305 B2 * 10/2012 Singleton .................. E05D 7/04 16/253
8,914,660 B2 12/2014 Tanaka
(Continued)

FOREIGN PATENT DOCUMENTS

EP 3409867 A1 * 12/2018 ............ E05D 7/043
FR 2896282 7/2007
(Continued)

OTHER PUBLICATIONS

Master Halco—Postmaster Fence System—Installation Guidline Sheets; www.masterhalco.com.
(Continued)

*Primary Examiner* — Amber R Anderson
*Assistant Examiner* — Zachary A Hall
(74) *Attorney, Agent, or Firm* — Dennis D. Brown; Brown Patent Law, P.L.L.C.

(57) ABSTRACT

A fence gate assembly, and a hat channel hinge apparatus therefor, wherein the hinge apparatus uses a hat channel bracket secured on a round gate post for adjustably holding and positioning a hinge pin element.

18 Claims, 5 Drawing Sheets

(56) References Cited

U.S. PATENT DOCUMENTS

| | | | | |
|---|---|---|---|---|
| 10,676,958 | B2 | 6/2020 | Short et al. | |
| 10,760,298 | B2 | 9/2020 | Crandall et al. | |
| 11,359,426 | B2 * | 6/2022 | Davis | E05D 5/02 |
| 11,578,502 | B2 | 2/2023 | Naylor | |
| 2004/0093689 | A1 * | 5/2004 | Sosa | E05F 1/1215<br>16/301 |
| 2008/0296547 | A1 | 12/2008 | Renteria | |
| 2012/0036786 | A1 * | 2/2012 | Stull | E05F 1/1215<br>16/249 |
| 2016/0145893 | A1 | 5/2016 | Coulston et al. | |
| 2023/0136531 | A1 * | 5/2023 | Alarcon | E05D 7/0423<br>16/246 |
| 2025/0027349 | A1 * | 1/2025 | McBurney | E05D 5/06 |

FOREIGN PATENT DOCUMENTS

| | | | | | |
|---|---|---|---|---|---|
| FR | 3142208 | | | 5/2024 | |
| GB | 686613 | A | * | 1/1953 | E05D 7/04 |
| GB | 2116597 | | | 3/1983 | |
| GB | 2199601 | | | 2/1988 | |
| GB | 2289073 | | | 11/1995 | |
| GB | 2300435 | | | 6/1996 | |
| GB | 2307511 | A | * | 5/1997 | E05D 5/02 |
| GB | 2426526 | | | 11/2006 | |
| GB | 2570912 | | | 8/2019 | |

OTHER PUBLICATIONS

Why Z Post? www.metalfencepost.com.

Bullet Fence Systems / https://bulletfence.com/products/clamp-on-adjustable-gate-hanger-and-hinge.

* cited by examiner

FENCE GATE ASSEMBLY, AND HAT CHANNEL HINGE APPARATUS THEREFOR

FIELD OF THE INVENTION

The present invention relates to gate assemblies for fences, and to gate hinge apparatuses therefor.

BACKGROUND OF THE INVENTION

A need exists for improved fence gate assemblies, and improved gate hinge apparatuses therefor, for residential, business, farm, ranch, and other uses. In general, the gate hinge apparatuses currently available in the art (i) lack sufficient strength and durability and/or (ii) are costly, overly complex, and/or difficult to install. Moreover, most of the current gate hinge apparatuses are not adjustable, which makes them (a) even more difficult to install and use and (b) less able to accommodate variations, changes, or inaccuracies in the construction, design, or layout of the fence and gate system.

SUMMARY OF THE INVENTION

The present invention provides a fence gate assembly, and a hat channel hinge apparatus therefor, which alleviate the problems and satisfy the needs mentioned above. The inventive hat channel gate hinge is less costly and less complex than prior gate hinge assemblies, yet very strong and durable. Moreover, the hat channel hinge apparatus is adjustable to (i) provided greater flexibility for accommodating variations, changes, or inaccuracies in the construction, design, or layout of the fence and gate system and (ii) make the inventive hinge apparatus much easier and more convenient to install.

In addition, the inventive hat channel hinge apparatus (a) allows the use of low cost materials which are readily available, (b) can be installed without welding, (c) accommodates multiple mounting positions for multiple hinge styles, and (d) is configured to provide a cradling effect which prevents twisting and provides greater strength.

In one aspect, there is provided a hat channel hinge apparatus for a gate which preferably comprises: (a) a hat channel bracket having a forward face which is positionable against the longitudinally extending exterior of a pipe or other round post and (b) a U-bolt which is positionable on the pipe or other round post to hold the hat channel bracket.

The hat channel bracket of the hinge apparatus preferably comprises a U-shaped channel which extends longitudinally from a lower end to an upper end of the hat channel bracket and includes (i) a longitudinally extending back wall, (ii) a longitudinally extending left side wall which projects from the back wall toward the forward face of the hat channel bracket, (iii) a longitudinally extending right side wall which projects from the back wall toward the forward face of the hat channel bracket, and (iv) a longitudinally extending opening of the U-shaped channel in the forward face of the hat channel bracket. The forward face of the hat channel bracket preferably also includes (1) a left flange plate which projects laterally outward from a left side of the longitudinally extending opening of the U-shaped channel and (2) a right flange plate which projects laterally outward from a right side of the longitudinally extending opening of the U-shaped channel.

The U-bolt of the hat channel hinge apparatus comprises (i) a first threaded leg which is receivable through an aperture provided in the left flange plate of the hat channel bracket when the forward face of the hat channel bracket is positioned against the pipe or other round post and (ii) a second threaded leg which is receivable through an aperture provided in the right flange plate of the hat channel bracket when the forward face of the hat channel bracket is positioned against the pipe or other round post.

The hinge apparatus preferably also comprises a hinge pin element, wherein at least a portion of the hinge pin element (i) extends outwardly from the back wall, the left side wall, or the right side wall of the U-shaped channel of the hat channel bracket and (ii) comprises an upwardly or downwardly extending gate hinge pin.

In another aspect, there is provided a gate assembly which preferably comprises: (i) an upwardly extending pipe or other round post; (ii) a hat channel bracket having a forward face which is positioned against a longitudinal exterior of the pipe or other round post; (iii) a U-bolt in which the pipe or other round post is received; (iv) a hinge pin element; and (v) a gate.

The hat channel bracket of the gate assembly preferably comprises a U-shaped channel which extends longitudinally from a lower end to an upper end of the of the hat channel bracket and includes: (i) a longitudinally extending back wall, (ii) a longitudinally extending left side wall which projects from the back wall toward the forward face of the hat channel bracket, (iii) a longitudinally extending right side wall which projects from the back wall toward the forward face of the hat channel bracket, and (iv) a longitudinally extending opening of the U-shaped channel in the forward face of the hat channel bracket which is positioned on the longitudinal exterior of the pipe or other round post.

The forward face of the hat channel bracket of the gate assembly preferably also includes: (a) a left flange plate which projects laterally outward from a left side of the longitudinally extending opening of the U-shaped channel and (b) a right flange plate which projects laterally outward from a right side of the longitudinally extending opening of the U-shaped channel.

The U-bolt of the gate assembly preferably comprises a first threaded leg which extends through an aperture provided in the left flange plate of the hat channel bracket and a second threaded leg which extends through an aperture provided in the right flange plate of the hat channel bracket.

The hinge pin element of the gate assembly, or at least a portion of the hinge pin element, (i) extends outwardly from the back wall, the left side wall, or the right side wall of the U-shaped channel of the hat channel bracket and (ii) comprises an upwardly or downwardly extending gate hinge pin. The gate of the gate assemble has a hinge pin receiving member thereon in which the gate hinge pin is received for pivoting the gate on the gate hinge pin.

Further objects, features, and advantages will be apparent to those in the art upon reviewing the accompanying drawings and upon reading the following Detailed Description of the Preferred Embodiments.

DETAILED DESCRIPTION OF THE PREFERRED EMBODIMENTS

Figure 1:
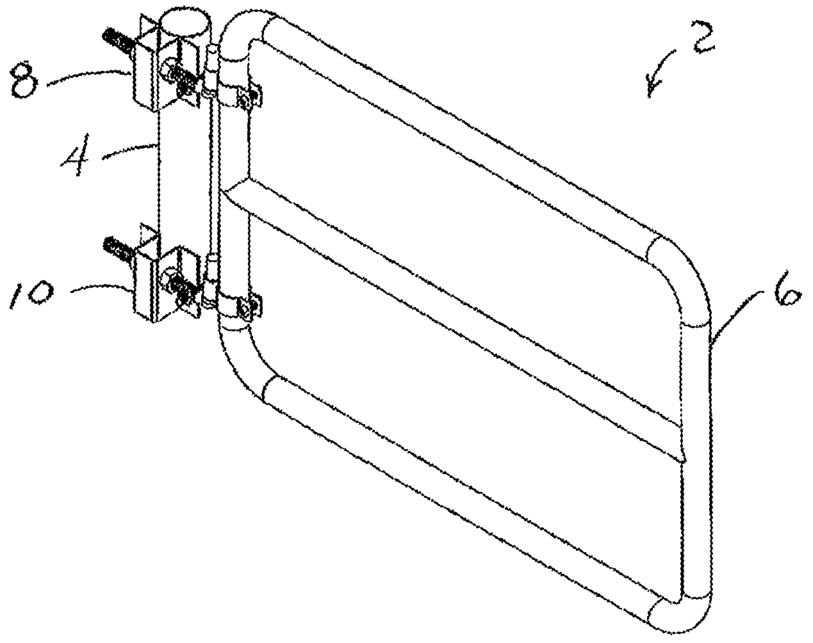
FIG. 1 a perspective view of an embodiment 2 of the gate assembly provided by the present invention.
Figure 4:
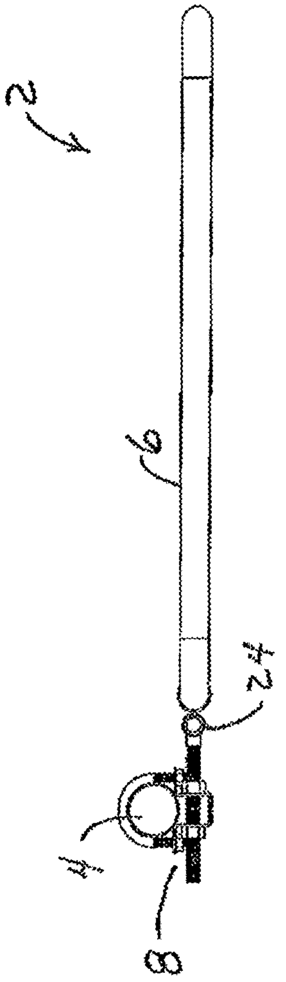
FIG. 4 is a top view of the inventive gate assembly 2.

An embodiment 2 of the inventive gate assembly is illustrated in FIGS. 1-7. The inventive gate assembly 2 preferably comprises: (i) a round gate post (e.g., an elongate segment of metal pipe or other round post) 4 which extends upwardly from the ground; (ii) a gate 6; and (iii) one or more, preferably an upper and lower pair 8 and 10, of the hat channel hinge apparatuses provided by the present invention.

Each of the upper and lower hat channel hinge apparatuses 8 and 10 preferably comprises: (a) hat channel bracket 12 having a forward face 14 which is positioned against a longitudinal exterior 16 of the pipe or other round post 4; (b) a U-bolt 18 for holding the hat channel bracket 12 on the pipe or other round post 4; (c) a hinge pin element 20 which preferably provides an upwardly or downwardly extending gate hinge pin 22; and (d) a hinge pin receiving member 24 provided on the gate 6 for pivotably receiving the gate hinge pin 22.

The hat channel bracket 12 of the inventive hat channel hinge apparatus 8 or 10 preferably comprises a U-shaped channel 26 which extends longitudinally from a lower end 28 to an upper end 30 of the hat channel bracket 12 and includes: (i) a longitudinally extending back wall 32, (ii) a longitudinally extending left side wall 34 which projects from the back wall 32 toward the forward face 14 of the hat channel bracket 12, (iii) a longitudinally extending right side wall 36 which projects from the back wall 32 toward the forward face 14 of the hat channel bracket 12, and (iv) a longitudinally extending opening 38 of the U-shaped channel 26 in the forward face 14 of the hat channel bracket 12.

The forward face 14 of the hat channel bracket 12 also comprises (i) a left flange plate 40 which extends at least partially along (preferably fully along), and projects laterally outward from, the left side of the longitudinally extending opening 38 of the U-shaped channel 26 and (ii) a right flange plate 44 which extends at least partially along (preferably fully along), and projects laterally outward from, the right side of the longitudinally extending opening 38 of the U-shaped channel 26. The left flange plate 40 and the right flange plate 44 of the hat channel bracket 12 are preferably substantially coplanar.

The cross-sectional U-shape of the U-shaped channel 26 of the hat channel bracket 12 will preferably be a rectangular U-shape wherein the back wall 32 is flat and the left and right side walls 34 and 36 of the U-shaped channel 26 are substantially parallel. However, by way of example but not by way of limitation, it will be understood that (i) the back wall 32 of the U-shaped channel 26 can alternatively have a curved cross-sectional shape, (ii) the left and right side walls 34 and 36 can alternatively diverge away from each other to some degree as they extend toward the channel opening 38, and/or (iii) the U-shaped channel 26 can otherwise have a more rounded or less rectangular cross-sectional shape.

As used herein and in the claims regarding the left and right side walls 34 and 36 of the U-shaped channel 26 of the hat channel bracket 12, the term “substantially parallel” means that the left and right side walls 34 and 36 are parallel or that at least (i) the left side wall 34 of the U-shaped channel 26 projects forwardly from the back wall 32 of the U-shaped channel 26 at an angle of about 90° (i.e., within a range of ±5°) and (ii) the right side wall 36 of the U-shaped channel 26 projects forwardly from the back wall 32 of the U-shaped channel 26 at an angle of about 90° (i.e., within a range of ±5°).

As used herein and in the claims regarding the left and right flange plates 40 and 44 of the hat channel bracket 12, the term “substantially coplanar” means that the left and right flange plates 40 and 44 are coplanar or at least that (i) the left flange plate 40 of the hat channel bracket 12 extends laterally outward at an angle of about 90° (i.e., within a range of ±5°) with respect to the left side wall 34 of the U-shaped channel 26 and (ii) the right flange plate 44 of the hat channel bracket 12 extends laterally outward at an angle of about 90° (i.e., within a range of ±5°) with respect to the right side wall 36 of the U-shaped channel 26.

As will be understood by those in the art, hat channel brackets 12 suitable for use in the inventive hat channel hinge apparatus 8 or 10 can be formed using various metal fabrication techniques. As another alternative, metal hat channel brackets 12 can be produced by laterally cutting commercially available hat-channel fence posts, such as POSTMASTER hat-channel line posts sold by Master Halco, into short segments of desired length.

When installing the inventive hat channel hinge apparatus 8 or 10 on the gate post 4, the forward face 14 of the hat channel bracket 12 is placed on one side of the exterior of 16 of the round gate post 4 such that (i) the longitudinal channel opening 38 in the forward face 14 of the hat channel bracket 12 is parallel with the gate post 4 and (ii) the outer curve of the exterior 16 of the round gate post 4 is laterally cradled in hat channel opening 38.

To hold the hat channel bracket 12 on the gate post 4 in this position, the U-bolt 18 is delivered laterally on the opposite side of the round gate post 4 such that (a) the gate post 4 is received in the U-bolt 18, (b) one threaded leg 48 of the U-bolt 18 is delivered through an aperture provided in the left flange plate 40 of the hat channel bracket 12, and (c) the other threaded leg 52 of the U-bolt 18 is delivered through an aperture 54 provided in the right flange plate 44.

The hat channel bracket 12 and the U-bolt 18 are then tightly secured on the round gate post 4 using a nut 56 which is threaded onto the threaded leg 48 of the U-bolt 18 and a nut 58 which is threaded onto the other threaded leg 52 of the U-bolt 18. With the outer curve of the exterior 16 of the round gate post 4 being thereby tightly cradled in the hat channel opening 38 in this manner, the attachment of the hat channel bracket 12 is strengthened and the hat channel bracket 12 is prevented from being twisted out of vertical alignment with the gate post 4.

The hinge pin element 20 of the hat channel hinge apparatus 8 or 10, or at least a distal or outer portion of the hinge pin element 20, extends outwardly from the back wall 32, the left side wall 34, or the right side wall 36 of the U-shaped channel 26 of the hat channel bracket 12. The hinge pin element 20 includes an upwardly or downwardly extending gate hinge pin structure 22 which is positioned outside of the U-shaped channel 26.

The hinge pin element 20 is preferably a J-bolt structure having an L shape which comprises a threaded arm 60 with a round gate hinge pin 22 provided on the distal end portion of the threaded arm 60. The gate hinge pin 22 of the J-bolt 20 preferably extends upwardly or downwardly at an angle of about 90° (i.e., within a range of ±5°) with respect to the threaded arm 60.

In the embodiment 8 or 10 of the inventive hat channel hinge apparatus illustrated in FIGS. 1-7, the threaded arm 60 of the J-bolt 20 extends through both (i) an aperture provided in the left side wall 34 of the U-shaped channel 26 of the hat channel bracket 12 and (ii) an aperture 66 provided in the right side wall 36 of the U-shaped channel 26 such that a distal portion 68 of the J-bolt 20 which includes the hinge pin 22 extends outwardly from the left side wall 34. The J-bolt 20 is adjustably retained in this position by (i) a nut 70, provided on the threaded arm 60 of the J-bolt 20, which is tightened against the exterior of the left side wall 34 of the U-shaped channel 26 and (ii) a nut 72, provided on the threaded arm 60 of the J-bolt 20, which is tightened against the exterior of the right side wall 36 of the U-shaped channel 26.

This adjustable attachment of the J-bolt 20 allows the gate hinge pin 22 to be repositioned at any desired distance from the left side wall 34 of the hat channel bracket 12, as limited only by the length of the threaded arm 60 of the J-bolt 20. Moreover, the adjustable attachment of the J-bolt 20 allows the direction of the J-bolt 20 to be reversed so that the distal portion 68 of the J-bolt 20 which includes the hinge pin 22 will extend outwardly from the right side wall 36.

Figure 2:
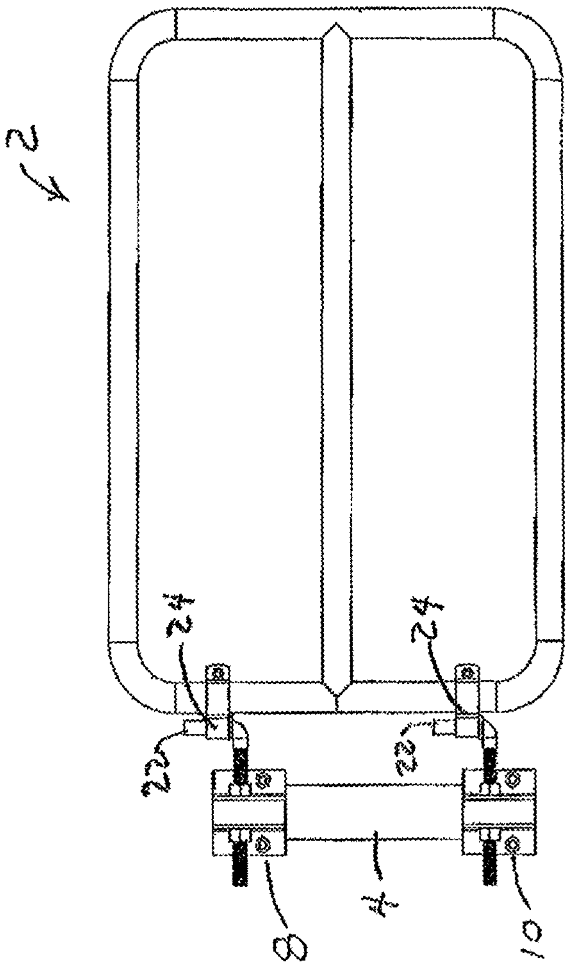
FIG. 2 is a front elevational view of the inventive gate assembly 2.
Figure 3:
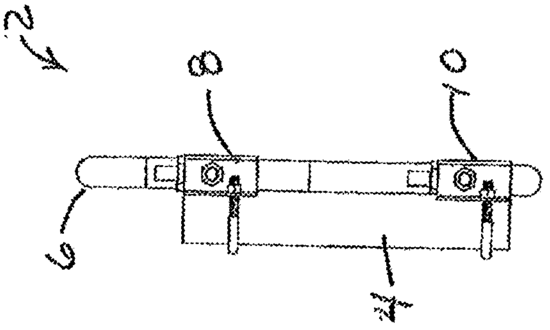
FIG. 3 is an elevational left side view of the inventive gate assembly 2.
Figure 5:
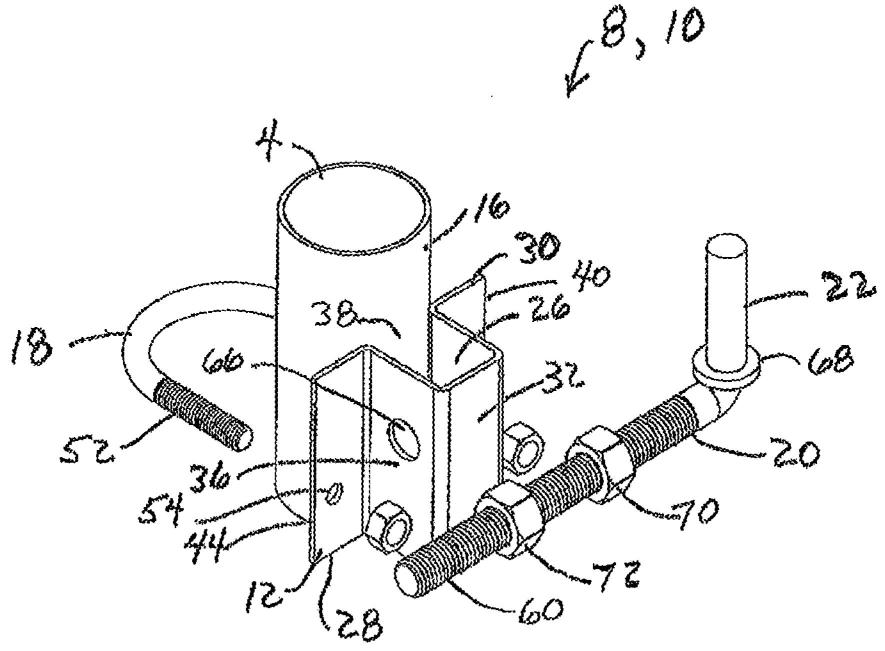
FIG. 5 is an exploded perspective view of an embodiment 8 of the hat channel hinge apparatus provided by the present invention.
Figure 7:
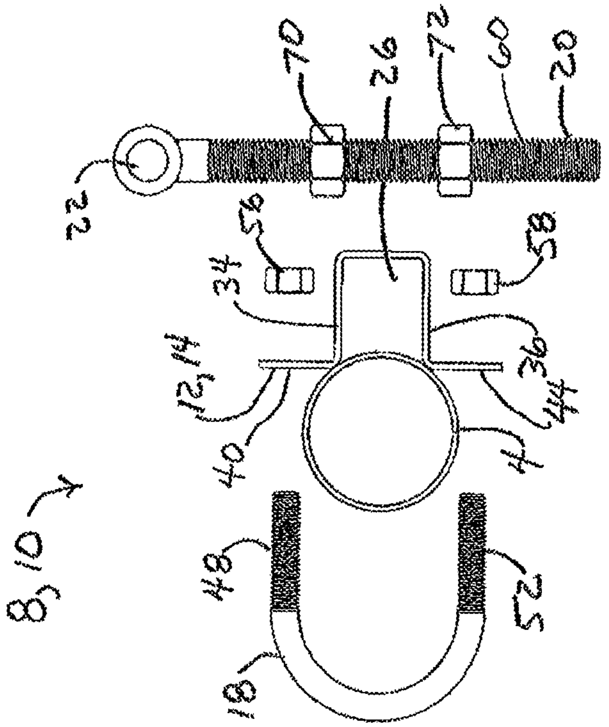
FIG. 7 is an exploded top view of the inventive hat channel hinge apparatus 8.
Figure 6:
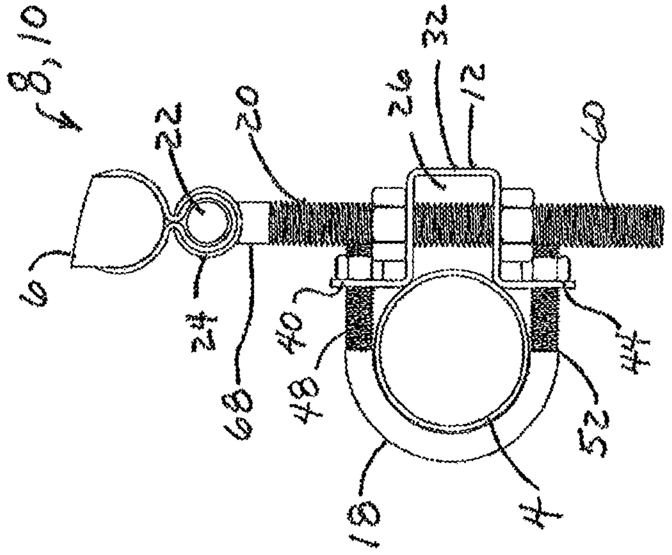
FIG. 6 is a top view of the inventive hat channel hinge apparatus 8.

In addition, the adjustable attachment of the J-bolt 20 allows the orientation of the gate hinge pin 22 to be changed so that, e.g., the hinge pin 22 extends vertically upward or extends vertically downward. For example, in a gate assembly 2 as illustrated in FIGS. 1-3 wherein the gate 6 is mounted using an upper hat channel hinge apparatus 8 positioned above a lower hat channel hinge apparatus 10, the gate hinge pin 22 of the lower hat channel hinge 10 will preferably extend upwardly so that the gate 6 will be supported above the ground by the lower hinge apparatus 10. However, the gate hinge pin 22 of the upper hat channel hinge apparatus 8 can be either (a) oriented upwardly so that the upper hinge apparatus 8 also assists in supporting the weight of the gate 6 or (b) oriented downwardly to prevent the gate 6 from being lifted off of the hinge apparatuses 8 and 10.

Figure 8:
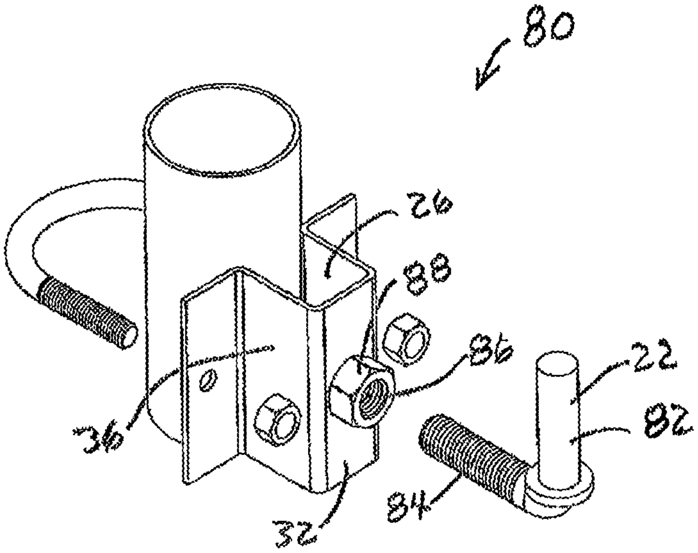
FIG. 8 is an exploded perspective view of an alternative embodiment 80 of the hat channel hinge apparatus provided by the present invention.
Figure 9:
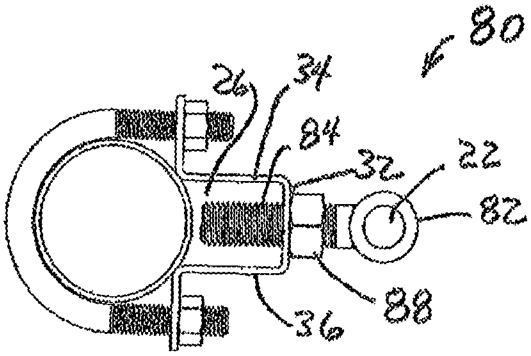
FIG. 9 is a top view of the inventive hat channel hinge apparatus 80.

In an alternative embodiment 80 of the inventive hat channel hinge apparatus illustrated in FIGS. 8 and 9, the adjustable hinge apparatus 80 is essentially identical to the inventive hat channel hinge apparatus 8 or 10 discussed above except that: (i) a J-bolt 82 is used which will typically have a shorter threaded arm 84; (ii) the threaded arm 84 of the J-bolt 82 extends through only a single aperture 86 which can be provided in either the back wall 32, the left side wall 34, or the right side wall 36 of the U-shaped channel 26 of the hat channel bracket 12; (iii) the J-bolt 82 is adjustably retained by a nut 88 which is welded or otherwise attached to either the exterior or the interior of the wall 32, 34, or 36; and (iv) the J-bolt 82 can alternatively be retained, e.g., using two nuts wherein one nut is positioned inside and the other is positioned outside the U-shaped channel 26 wherein one, or neither, of the nuts is welded or otherwise permanently held in place.

For each of the inventive hat channel hinge apparatuses 8, 10, or 80, the hinge pin receiving member 24 can comprise one or more hinge barrels, one or more hinge cylinders, one or more hinge knuckles, or any other type of hinge member which (i) can be clamped on the gate 6 as illustrated in FIGS. 1-3 or otherwise provided on the gate 6 and (ii) will receive the hinge pin 22 of the gate assembly for pivoting the gate 6 on the hinge pin 22.

It will also be understood that, if desired, the inventive gate assembly 2 can further include any other components and features which are commonly used in fence gate systems. In addition, rather than being adjustable, the J-bolt or other hinge pin element 20 of the hat channel hinge apparatus 8, 10, or 80 can be welded, glued, or otherwise secured on or through any of the back, left, and/or right side walls 32, 34, and/or 36 of the U-shaped channel 26 of the hat channel bracket 12.

Thus, the present invention is well adapted to carry out the objects and attain the ends and advantages mentioned above as well as those inherent therein. While presently preferred embodiments have been described for purposes of this disclosure, numerous changes and modifications will be apparent to those in the art. Such changes and modifications are encompassed within the invention as described herein and as set forth in the claims.

What is claimed is:

1. A hinge apparatus for a gate comprising:

a hat channel bracket having a forward face which is positionable against a longitudinally extending exterior of a pipe or other round post, the hat channel bracket comprising a U-shaped channel which extends longitudinally from a lower end to an upper end of the hat channel bracket and includes (i) a longitudinally extending back wall, (ii) a longitudinally extending left side wall which projects from the back wall toward the forward face of the hat channel bracket, (iii) a longitudinally extending right side wall which projects from the back wall toward the forward face of the hat channel bracket, and (iv) a longitudinally extending opening of the U-shaped channel in the forward face of the hat channel bracket and the forward face of the hat channel bracket including (a) a left flange plate which projects laterally outward from a left side of the longitudinally extending opening of the U-shaped channel and (b) a right flange plate which projects laterally outward from a right side of the longitudinally extending opening of the U-shaped channel;

a U-bolt which is positionable on the pipe or other round post to hold the hat channel bracket, the U-bolt having a first threaded leg which is receivable through an aperture provided in the left flange plate of the hat channel bracket when the forward face of the hat channel bracket is positioned against the pipe or other round post and a second threaded leg which is receivable through an aperture provided in the right flange plate of the hat channel bracket when the forward face of the hat channel bracket is positioned against the pipe or other round post; and a hinge pin element, at least a portion of which (i) extends outwardly from the back wall, the left side wall, or the right side wall of the U-shaped channel of the hat channel bracket and (ii) comprises a gate hinge pin, the left side wall of the U-shaped channel projecting forwardly from the back wall of the U-shaped channel at an angle of about 90° and the right side wall of the U-shaped channel projecting forwardly from the back wall of the U-shaped channel at an angle of about 90°.

2. The hinge apparatus of claim 1 further comprising the left side wall of the U-shaped channel being parallel to the right side wall of the U-shaped channel.

3. The hinge apparatus of claim 1 further comprising:

the left flange plate of the hat channel bracket extending laterally outward at an angle of about 90° with respect to the left side wall of the U-shaped channel and the right flange plate of the hat channel bracket extending laterally outward at an angle of about 90° with respect to the right side wall of the U-shaped channel.

4. The hinge apparatus of claim 1 further comprising the left flange plate of the hat channel bracket and the right flange plate of the hat channel bracket being coplanar.

5. The hinge apparatus of claim 1 further comprising:

the hinge pin element being a J-bolt structure;

the portion of the hinge pin element being a distal portion of the J-bolt structure;

the J-bolt structure having a threaded arm which extends through an aperture provided in the back wall of the U-shaped channel of the hat channel bracket; and the gate hinge pin of the J-bolt structure extending upwardly or downwardly at an angle of about 90° with respect to the threaded arm.

6. The hinge apparatus of claim 1 further comprising:

the hinge pin element being a J-bolt structure;

the portion of the hinge pin element being a distal portion of the J-bolt structure;

the J-bolt structure having a threaded arm which extends through (i) an aperture provided in the left side wall of the U-shaped channel of the hat channel bracket and/or (ii) an aperture provided in the right side wall of the U-shaped channel of the hat channel bracket; and the gate hinge pin of the J-bolt structure extending upwardly or downwardly at an angle of about 90° with respect to the threaded arm.

7. A gate assembly comprising:

an upwardly extending pipe or other round post;

a hat channel bracket having a forward face which is positioned against a longitudinal exterior of the pipe or other round post, the hat channel bracket comprising a U-shaped channel which extends longitudinally from a lower end to an upper end of the hat channel bracket and includes (i) a longitudinally extending back wall, (ii) a longitudinally extending left side wall which projects from the back wall toward the forward face of the hat channel bracket, (iii) a longitudinally extending right side wall which projects from the back wall toward the forward face of the hat channel bracket, and (iv) a longitudinally extending opening of the U-shaped channel in the forward face of the hat channel bracket which is positioned on the longitudinal exterior of the pipe or other round post and the forward face of the hat channel bracket including a left flange plate which projects laterally outward from a left side of the longitudinally extending opening of the U-shaped channel and a right flange plate which projects laterally outward from a right side of the longitudinally extending opening of the U-shaped channel;

a U-bolt in which the pipe or other round post is received, the U-bolt comprising a first threaded leg which extends through an aperture provided in the left flange plate of the hat channel bracket and a second threaded leg which extends through an aperture provided in the right flange plate of the hat channel bracket;

a hinge pin element, at least a portion of which (i) extends outwardly from the back wall, the left side wall, or the right side wall of the U-shaped channel of the hat channel bracket and (ii) comprises a gate hinge pin; and a gate having a hinge pin receiving member thereon in which the gate hinge pin is received for pivoting the gate on the gate hinge pin, the left side wall of the U-shaped channel projecting forwardly from the back wall of the U-shaped channel at an angle of about 90° and the right side wall of the U-shaped channel projecting forwardly from the back wall of the U-shaped channel at an angle of about 90°.

8. The gate assembly of claim 7 further comprising the left side wall of the U-shaped channel being parallel to the right side wall of the U-shaped channel.

9. The gate assembly of claim 7 further comprising:

the left flange plate of the hat channel bracket extending laterally outward at an angle of about 90° with respect to the left side wall of the U-shaped channel and the right flange plate of the hat channel bracket extending laterally outward at an angle of about 90° with respect to the right side wall of the U-shaped channel.

10. The gate assembly of claim 7 further comprising the left flange plate of the hat channel bracket and the right flange plate of the hat channel bracket being coplanar.

11. The gate assembly of claim 7 further comprising:

the hinge pin element being a J-bolt structure;

the portion of the hinge pin element being a distal portion of the J-bolt structure;

the J-bolt structure having a threaded arm which extends through an aperture provided in the back wall of the U-shaped channel of the hat channel bracket; and the gate hinge pin of the J-bolt structure extending upwardly or downwardly at an angle of about 90° with respect to the threaded arm.

12. The gate assembly of claim 7 further comprising:

the hinge pin element being a J-bolt structure;

the portion of the hinge pin element being a distal portion of the J-bolt structure;

the J-bolt structure having a threaded arm which extends through (i) an aperture provided in the left side wall of the U-shaped channel of the hat channel bracket and/or (ii) an aperture provided in the right side wall of the U-shaped channel of the hat channel bracket; and the gate hinge pin of the J-bolt structure extending upwardly or downwardly at an angle of about 90° with respect to the threaded arm.

13. The gate assembly of claim 7 further comprising the hinge pin receiving member comprising at least one barrel, cylinder, or knuckle in which the hinge pin is pivotably received.

14. The gate assembly of claim 7 further comprising:

the hat channel bracket being a first hat channel bracket, the U-bolt being a first U-bolt, the hinge pin element being a first hinge pin element, and the hinge pin receiving member being a first hinge pin receiving member and the gate assembly further including a second hat channel bracket having a forward face which is positioned against the longitudinal exterior of the pipe or other round post above the first hat channel bracket, the second hat channel bracket comprising a U-shaped channel which extends longitudinally from a lower end to an upper end of the second hat channel bracket and includes (i) a longitudinally extending back wall, (ii) a longitudinally extending left side wall which projects from the back wall of the second hat channel bracket toward the forward face of the second hat channel bracket, (iii) a longitudinally extending right side wall which projects from the back wall of the second hat channel bracket toward the forward face of the second hat channel bracket, and (iv) a longitudinally extending opening of the U-shaped channel in the forward face of the second hat channel bracket which is positioned on the longitudinal exterior of the pipe or other round post and the forward face of the second hat channel bracket including (a) a left flange plate which projects laterally outward from a left side of the longitudinally extending opening of the U-shaped channel of the second hat channel bracket and (b) a right flange plate which projects laterally outward from a right side of the longitudinally extending opening of the U-shaped channel of the second hat channel bracket;

a second U-bolt in which the pipe or other round post is received, the second U-bolt comprising a first threaded leg which extends through an aperture provided in the left flange plate of the second hat channel bracket and a second threaded leg which extends through an aperture provided in the right flange plate of the second hat channel bracket;

a second hinge pin element, at least a portion of which (i) extends outwardly from the back wall, the left side wall, or the right side wall of the U-shaped channel of the second hat channel bracket and (ii) comprises a second gate hinge pin; and a second hinge pin receiving member which is positioned on the gate above the first hinge pin receiving member and which receives the second gate hinge pin for pivoting the gate.

15. The gate assembly of claim 14 further comprising:

the left side wall of the U-shaped channel of the second hat channel bracket projecting forwardly from the back wall of the U-shaped channel of the second hat channel bracket at an angle of about 90°;

the right side wall of the U-shaped channel of the second hat channel bracket projecting forwardly from the back wall of the U-shaped channel of the second hat channel bracket at an angle of about 90°;

the left flange plate of the first hat channel bracket extending laterally outward at an angle of about 90° with respect to the left side wall of the U-shaped channel of the first hat channel bracket;

the right flange plate of the first hat channel bracket extending laterally outward at an angle of about 90° with respect to the right side wall of the U-shaped channel of the first hat channel bracket;

the left flange plate of the second hat channel bracket extending laterally outward at an angle of about 90° with respect to the left side wall of the U-shaped channel of the second hat channel bracket; and the right flange plate of the second hat channel bracket extending laterally outward at an angle of about 90° with respect to the right side wall of the U-shaped channel of the second hat channel bracket.

16. The gate assembly of claim 15 further comprising:

the first hinge pin element being a first J-bolt structure;

the portion of the first hinge pin element being a distal portion of the first J-bolt structure;

the first J-bolt structure having a threaded arm which extends through (i) an aperture provided in the left side wall of the U-shaped channel of the first hat channel bracket and (ii) an aperture provided in the right side wall of the U-shaped channel of the first hat channel bracket;

the gate hinge pin of the first J-bolt structure extending upwardly at an angle of about 90° with respect to the threaded arm of the first J-bolt structure;

the second hinge pin element being a second J-bolt structure;

the portion of the second hinge pin element being a distal portion of the second J-bolt structure;

the second J-bolt structure having a threaded arm which extends through (i) an aperture provided in the left side wall of the U-shaped channel of the second hat channel bracket and (ii) an aperture provided in the right side wall of the U-shaped channel of the second hat channel bracket; and the gate hinge pin of the second J-bolt structure extending upwardly or downwardly at an angle of about 90° with respect to the threaded arm of the second J-bolt structure.

17. The gate assembly of claim 14 further comprising:

the first hinge pin receiving member comprising at least one barrel, cylinder, or knuckle in which the gate hinge pin of the first hinge pin element is pivotably received and the second hinge pin receiving member comprising at least one barrel, cylinder, or knuckle in which the gate hinge pin of the second hinge pin element is pivotably received.

18. A hinge apparatus for a gate comprising:

a hat channel bracket having a forward face which is positionable against a longitudinally extending exterior of a pipe or other round post, the hat channel bracket comprising a U-shaped channel which extends longitudinally from a lower end to an upper end of the hat channel bracket and includes (i) a longitudinally extending back wall, (ii) a longitudinally extending left side wall which projects from the back wall toward the forward face of the hat channel bracket, (iii) a longitudinally extending right side wall which projects from the back wall toward the forward face of the hat channel bracket, and (iv) a longitudinally extending opening of the U-shaped channel in the forward face of the hat channel bracket and the forward face of the hat channel bracket including (a) a left flange plate which projects laterally outward from a left side of the longitudinally extending opening of the U-shaped channel and (b) a right flange plate which projects laterally outward from a right side of the longitudinally extending opening of the U-shaped channel;

a U-bolt which is positionable on the pipe or other round post to hold the hat channel bracket, the U-bolt having a first threaded leg which is receivable through an aperture provided in the left flange plate of the hat channel bracket when the forward face of the hat channel bracket is positioned against the pipe or other round post and a second threaded leg which is receivable through an aperture provided in the right flange plate of the hat channel bracket when the forward face of the hat channel bracket is positioned against the pipe or other round post;

a hinge pin element, at least a portion of which (i) extends outwardly from the left side wall or the right side wall of the U-shaped channel of the hat channel bracket and (ii) comprises a gate hinge pin;

the hinge pin element being a J-bolt structure;

the portion of the hinge pin element being a distal portion of the J-bolt structure;

the J-bolt structure having a threaded arm which extends through (i) an aperture provided in the left side wall of the U-shaped channel of the hat channel bracket and/or (ii) an aperture provided in the right side wall of the U-shaped channel of the hat channel bracket; and the gate hinge pin of the J-bolt structure extending upwardly or downwardly at an angle of about 90° with respect to the threaded arm.

* * * * *